US010092127B1

(12) United States Patent
Bruno

(10) Patent No.: US 10,092,127 B1
(45) Date of Patent: Oct. 9, 2018

(54) BALSA WOOD COOKWARE APPARATUS

(71) Applicant: Galen Bruno, Nashville, TN (US)

(72) Inventor: Galen Bruno, Nashville, TN (US)

( * ) Notice: Subject to any disclaimer, the term of this patent is extended or adjusted under 35 U.S.C. 154(b) by 696 days.

(21) Appl. No.: 13/857,772

(22) Filed: Apr. 5, 2013

(51) Int. Cl.
| | | |
|---|---|---|
| *A47J 45/00* | (2006.01) | |
| *A47J 27/00* | (2006.01) | |
| *A47J 45/06* | (2006.01) | |
| *A47J 45/07* | (2006.01) | |
| *A47J 37/10* | (2006.01) | |

(52) U.S. Cl.
CPC .............. *A47J 27/002* (2013.01); *A47J 37/10* (2013.01); *A47J 37/101* (2013.01); *A47J 45/06* (2013.01); *A47J 45/061* (2013.01); *A47J 45/062* (2013.01); *A47J 45/071* (2013.01); *Y10T 16/476* (2015.01)

(58) Field of Classification Search
CPC ........ A47J 27/002; A47J 37/10; A47J 37/101; A47J 45/061; A47J 45/062; A47J 45/071; A47J 45/06; Y10T 16/476
USPC ...................................... 220/573.1, 752, 912
See application file for complete search history.

(56) References Cited

U.S. PATENT DOCUMENTS

| | | | | |
|---|---|---|---|---|
| 4,491,235 | A  * | 1/1985 | Fournier | ............... A47J 27/002 |
| | | | | 126/390.1 |
| 2004/0112903 | A1 | 6/2004 | LoGiudice et al. | |
| 2007/0000096 | A1 | 1/2007 | Lazaroff | |
| 2008/0060530 | A1 | 3/2008 | Tetreault et al. | |
| 2009/0205559 | A1 * | 8/2009 | Lia | .......................... G01D 13/22 |
| | | | | 116/271 |
| 2012/0186385 | A1 * | 7/2012 | Holze | .................... B62K 21/26 |
| | | | | 74/551.9 |

* cited by examiner

*Primary Examiner* — J. Gregory Pickett
*Assistant Examiner* — Elizabeth Volz

(57) ABSTRACT

A cookware device includes balsa wood having a sufficiently high specific heat to allow a user to grasp the cookware device with one or more bare hands immediately after exposure to heat. The balsa wood may form part of the cookware device or may be located on a handle attached to the cookware device for a user to grasp. The balsa wood material includes a specific heat of greater than about 3.5 J/g*K, a density of less than about seven pounds per cubic foot, and/or a grain angle between about 30 degrees and about 60 degrees in some embodiments. The cookware device or cookware device handle may also cool quickly when removed from a heat source in some embodiments.

2 Claims, 9 Drawing Sheets

| Specimen | OvenTemperature (degrees F) | Density (lb/ft) | Surface Temperature (degrees F) | Resulting Specific Heat (J/g*K) |
|---|---|---|---|---|
| A | 350 | 6.6 | 126 | 2.78 |
| B | 350 | 8.3 | 138 | 2.54 |
| C | 350 | 10 | 137 | 2.55 |
| D | 350 | 8.34 | 138 | 2.54 |
| E | 350 | 5.5 | 100 | 3.50 |
| F | 350 | 5.3 | 96 | 3.65 |
| G | 350 | 4.8 | 95 | 3.68 |
| H | 350 | 5.7 | 100 | 3.50 |
| I | 350 | 8.7 | 140 | 2.50 |
| J | 350 | 9 | 130 | 2.69 |
| K | 350 | 7.8 | 122 | 2.87 |
| L | 350 | 8.5 | 133 | 2.63 |
| M | 350 | 9.5 | 149 | 2.35 |
| N | 350 | 6.7 | 135 | 2.59 |
| O | 350 | 7.6 | 148 | 2.36 |
| P | 350 | 7.5 | 150 | 2.33 |
| Q | 350 | 8.2 | 135 | 2.59 |
| R | 350 | 11.3 | 155 | 2.26 |
| S | 350 | 9.9 | 140 | 2.50 |
| T | 350 | 8.9 | 130 | 2.69 |

*FIG. 14*

| Specimen | OvenTemperature (degrees F) | Density (lb/ft) | Surface Temperature (degrees F) | Resulting Specific Heat (J/g*K) |
|---|---|---|---|---|
| A | 425 | 6.6 | 125 | 3.40 |
| B | 425 | 8.3 | 135 | 3.15 |
| C | 425 | 10 | 140 | 3.04 |
| D | 425 | 8.34 | 138 | 3.08 |
| E | 425 | 5.5 | 101 | 4.21 |
| F | 425 | 5.3 | 100 | 4.25 |
| G | 425 | 4.8 | 97 | 4.38 |
| H | 425 | 5.7 | 102 | 4.17 |
| I | 425 | 8.7 | 145 | 2.93 |
| J | 425 | 9 | 135 | 3.15 |
| K | 425 | 7.8 | 125 | 3.40 |
| L | 425 | 8.5 | 134 | 3.17 |
| M | 425 | 9.5 | 150 | 2.83 |
| N | 425 | 6.7 | 136 | 3.13 |
| O | 425 | 7.6 | 148 | 2.87 |
| P | 425 | 7.5 | 150 | 2.83 |
| Q | 425 | 8.2 | 140 | 3.04 |
| R | 425 | 11.3 | 160 | 2.66 |
| S | 425 | 9.9 | 150 | 2.83 |
| T | 425 | 8.9 | 140 | 3.04 |

FIG. 15

BALSA WOOD COOKWARE APPARATUS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND

The present invention relates generally to devices and materials for withstanding elevated temperatures and more particularly to cookware.

Cooking devices including cookware and bakeware are generally known in the art to include dishes or surfaces for containing one or more food items to be heated. Such food items may be heated during cooking using a heating source such as an oven, grill, stove-top, microwave, autoclave, burner, or open flame. In conventional cooking applications, such cookware and bakeware devices typically include a dish, plate, baking sheet or other surface or vessel for receiving food items. The cookware may be placed inside an oven or near a heating source such that the both the cookware and the food items contained in or on the cookware are both exposed to the applied heat. During cooking, cookware devices become hot as the food items are cooked. Thus, a user must take precautions to avoid getting burned when handling conventional cookware devices of this nature. Such precautions may include using one or more heat-resistant gloves, mitts or potholders to grasp and lift a heated cookware device during or after the cooking procedure. The need for external heat-resistant insulators such as gloves, mitts or potholders is inconvenient, as such items must be located and can be easily misplaced or lost in a kitchen.

Others have attempted to solve these problems by providing handles that allow a user to manipulate and hold cookware devices. Conventional cookware devices that are designed to be placed inside an oven during cooking may include one or more handles located on the outer perimeter of the cookware to allow a user to grasp the handle for removing the cookware devices from the heat source. Handles of this nature made of metal or other thermally-conductive material also become hot during cooking and do not eliminate the need for external insulators such as gloves, mitts or potholders.

To overcome these problems, others have attempted to provide dissimilar materials for cookware handles. For example, silicon, cork and plastic have been used for cookware handles. However, during cooking these items still become too hot to handle with a bare hand, and users must use an insulating material for handling heated cookware of this nature. Additionally, many of these alternative materials emit volatile organic compounds (VOCs) when heated in an oven or on a stovetop, and thus are not suitable for providing insulating handles on cookware devices. Moreover, many conventional insulating materials on cookware are not environmentally sustainable or renewable and are manufactured using chemical processes that result in waste that is harmful to the environment.

In many applications, it would be desirable in the cooking industry to provide a cookware device having a handle that could be gripped with an uncovered hand, even after the cookware device has been heated on a stovetop or in an oven for an extended period of time. Additionally, it is desirable to provide cookware devices with handles that provides a safer grip with a conventional potholder or glove by reducing the heat transfer through the insulating material such that the user is not exposed to a dangerous amount of heat. Such a cookware device could eliminate or reduce the need for insulating materials such as gloves, mitts or potholders and would make various cooking tasks simpler, easier and safer.

What is needed, then, are improvements in cookware devices and handles for cookware devices.

BRIEF SUMMARY

The present invention provides a cookware device having at least one gripping region or handle made of balsa wood. In some embodiments, the balsa wood includes a density of less than about seven pounds per cubic foot. In additional embodiments, the balsa wood is formed from a balsa wood blank having a grain angle of between about 30 degrees and about 60 degrees. In further embodiments, the handle is formed from a wood blank cut from a balsa tree that was living at least five years before being cut. The balsa wood handle may include two or more of the above properties for improving thermal properties.

It is an object of the present invention to provide a cookware device that can be gripped with a user's bare hand or with an insulating material such as a potholder, glove or mitt after exposure to heat in an oven or other heating source under normal cooking conditions.

It is a further object of the present invention to provide a handle for a cookware device that can be gripped with a user's bare hand or with an insulating material such as a potholder, glove or mitt after exposure to heat in an oven or other heating source under normal cooking conditions.

Another object of the present invention is to provide a handle for a cookware device that cools quickly when removed from a heat source such as stove or an oven.

A further object of the present invention is to provide a cookware device having a handle that cools quickly when removed from a heat source such as a stove or an oven.

An additional object of the present invention is to provide a cookware device or handle for a cookware device formed of an environmentally sustainable and renewable material.

It is an additional object of the present invention to provide a balsa wood handle having a specific heat of greater than about 3.5 joules per gram-Kelvin.

It is a further object of the present invention to provide a balsa wood handle having a density of less than about seven pounds per cubic foot.

Another object of the present invention is to provide a balsa wood handle having both a specific heat of greater than about 3.5 joules per gram-Kelvin and a density of less than about seven pounds.

Yet another object of the present invention is to provide a balsa wood handle having a grain angle of between about 30 degrees and about 60 degrees.

A further object of the present invention is to provide a balsa wood handle having a specific heat of greater than about 3.5 joules per gram-Kelvin and a grain angle of between about 30 degrees and about 60 degrees.

Yet another object of the present invention is to provide a balsa wood handle having a density of less than about seven pounds per cubic foot and a grain angle of between about 30 degrees and about 60 degrees.

Numerous other objects, features and advantages of the present disclosure will be readily apparent to those skilled in the art upon a reading of the following description when taken in conjunction with the accompanying drawings.

BRIEF DESCRIPTION OF THE DRAWINGS

FIG. 14 illustrates a chart showing experimental results from specific heat testing of various samples of balsa wood.

FIG. 15 illustrates a chart showing experimental results from specific heat testing of various samples of balsa wood.

DETAILED DESCRIPTION

Figure 1:
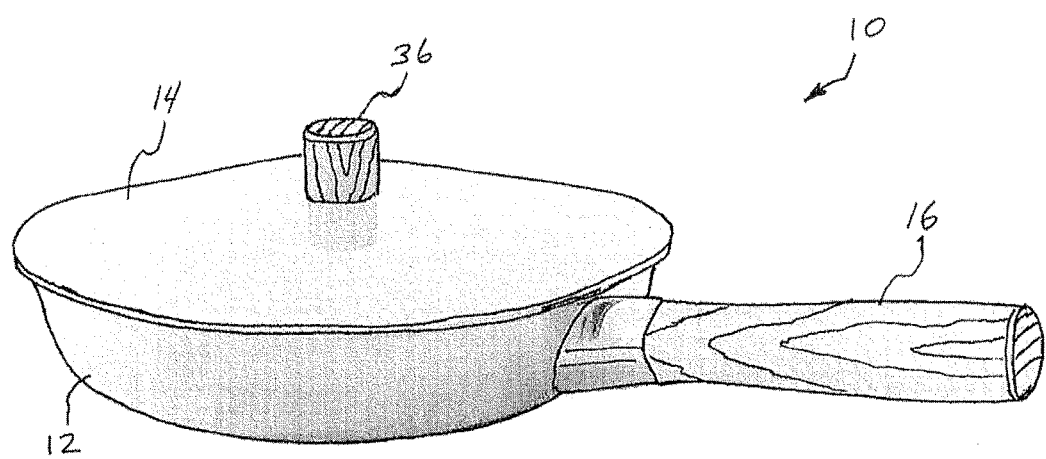
FIG. 1 illustrates a perspective view of an embodiment of a cooking apparatus including a handle in accordance with the present invention.

Referring now to the drawings, FIG. 1 illustrates an embodiment of a cookware apparatus 10 including a handle 16 in accordance with the present invention. Cookware apparatus 10 may include any type of dish for storing items to be heated, such as but not limited to stove-top, grill or oven cooking. Cookware apparatus 10 includes a cooking vessel such as a skillet, cooking sheet, cooking pan, cooking tray, griddle, bakeware, baking mold, etc. in some embodiments. In some embodiments, as seen in FIG. 1, cookware apparatus 10 includes a skillet or pan. Cookware apparatus 10 may also include a base 12 and a lid 14 in various embodiments.

As seen in FIG. 1, handle 16 is attached to cookware apparatus 10 to provide a structure by which a user may grasp or manipulate the cookware apparatus. Although handle 16 shown in FIG. 1 includes a protrusion extending from the cookware base 12, it will be readily appreciated by those of skill in the art that cookware apparatus 10 and handle 16 may take many alternative forms not shown in the drawings, and the embodiment seen in FIG. 1 is provided merely as one example. Handle 16 is generally defined as any structural region on cookware apparatus 10 shaped, positioned or configured for a user to grasp or engage manually with one or both hands for moving or manipulating cookware apparatus 10. During use, a user may grasp handle 16 to move cookware apparatus 10 onto or off of a heat source such as a stove, oven or grill. Handle 16 may be secured to base 12 on cookware apparatus 10 in some embodiments using a mechanical fastener. In various other embodiments, handle 16 may be attached to or detachably securable from a portion of cooking apparatus 10. In some embodiments, multiple handles in accordance with the present invention may be installed on cookware apparatus 10.

Handle 16 includes balsa wood in some embodiments. Balsa wood (ochroma pyramidale or ochroma lagopus) is generally used in various industries for applications requiring light-weight wooden materials. Balsa wood is conventionally known for having a cellular and/or porous microstructure that allows the application of elastic deformations under stress. Balsa wood also has a relatively high tensile strength for its relatively low density, as compared to other wooden materials. These properties have made the use of balsa wood advantageous in various applications for light-weight load-bearing members. For example, balsa wood is known for use in model airplane construction, model bridge construction, boats, surfboards and even fishing gear. However, balsa wood has traditionally not been used or considered advantageous for applications involving the application of heat such as cookware or cookware handles. Wood is generally considered to be flammable, and conventional wisdom instructs that wood is not suitable for applications requiring prolonged application of heat due to a risk of fire.

The present invention provides a cookware device 10 having a handle 16 made of balsa wood. Testing and experiments have revealed that certain types of balsa wood surprisingly include advantageous material properties for use in cookware devices. One desirable property is related to the specific heat of balsa wood. Specific heat is generally defined as the amount of energy required to raise the temperature of a unit volume or unit mass of material by a pre-defined temperature differential, such as one degree. The higher a material's specific heat, the more energy is required to raise the temperature of the material by that amount. A material with a high specific heat will take much longer to get hot when exposed to a heat source than a material with a lower specific heat. Commonly available information about balsa wood indicates the material has a specific heat of about 1.8 to 2.5 joules per gram-Kelvin (J/gK). However, a sample of balsa wood having specific heat in this range would likely be unsuitable for use as a cookware device to be gripped by a bare hand, because upon exposure to heat at about 400 degrees Fahrenheit for greater than about 30 minutes (normal cooking conditions) the surface temperature of the balsa wood would become too hot to touch with a user's bare hand.

However, specific heat experiments on various balsa wood samples have revealed that certain limited types of balsa wood exhibit unexpectedly high specific heat values, thereby making those types of balsa wood suitable for bare cookware devices or bare cooking device handles that can be grasped with a bare hand following heating under normal cooking conditions. For example, a first material property of balsa wood that unexpectedly influences specific heat is the material density. Two experiments were performed using samples of balsa wood material having different densities to determine a relationship between density and specific heat. The results of the experiments are seen in FIG. 14 and FIG. 15. In a first experiment, twenty samples of balsa wood were heated in an oven at about 350 degrees Fahrenheit for about 45 minutes. Unexpectedly, after heating, the surface temperatures of the balsa wood samples having densities of less than about seven pounds per cubic foot were about 100 degrees Fahrenheit or less. Results of the first experiment are shown in FIG. 14. The heated, low-density (density of less than about seven pounds per cubic foot) balsa wood samples could be handled with a bare hand without the use of an insulating material such as a glove, mitt or potholder. These samples included samples E, F, G and H identified in FIG. 14. The lower-density balsa wood materials exhibited a calculated specific heat of greater than about 3.5 J/g*K. Thus, the first experiment demonstrated that, under normal cooking conditions at about 350 degrees Fahrenheit for about 45 minutes, lower-density balsa wood samples could be handled with bare hands, whereas higher-density balsa wood samples became too hot to handle with bare hands.

A second experiment was also performed to test balsa wood samples at a higher cooking temperature. In the second experiment, twenty samples of balsa wood having different densities were heated in an oven to about 425 degrees Fahrenheit for about 45 minutes. It was unexpectedly discovered that the samples having a density of less than about seven pounds per cubic foot achieved a surface temperature of less than about 100 degrees Fahrenheit. As such, those lower-density samples could be touched with a bare hand immediately following exposure to heat. These samples include samples E, F, G and H as seen on the graph in FIG. 15. The higher-density samples achieved higher temperatures and thus could not be touched directly with a bare hand. Based at least on the results of the experiments, the present invention provides a cookware device having a handle including balsa wood, wherein the balsa wood has a density of less than about seven pounds per cubic foot. In some embodiments, to achieve more desirable thermal properties, the present invention provides a handle having balsa wood with a density of less than about six pounds per cubic foot and a specific heat of greater than about 3.5 J/g*K. It is noted that the specific heat values for the lower-density balsa wood samples are significantly higher than the conventional specific heat values (1.8 to 2.5 J/g*K) normally attributed to balsa wood materials based on existing scientific literature. These unexpected results for lower-density balsa wood materials provide a significant advantage over conventional handle materials for cookware devices.

Figure 2:
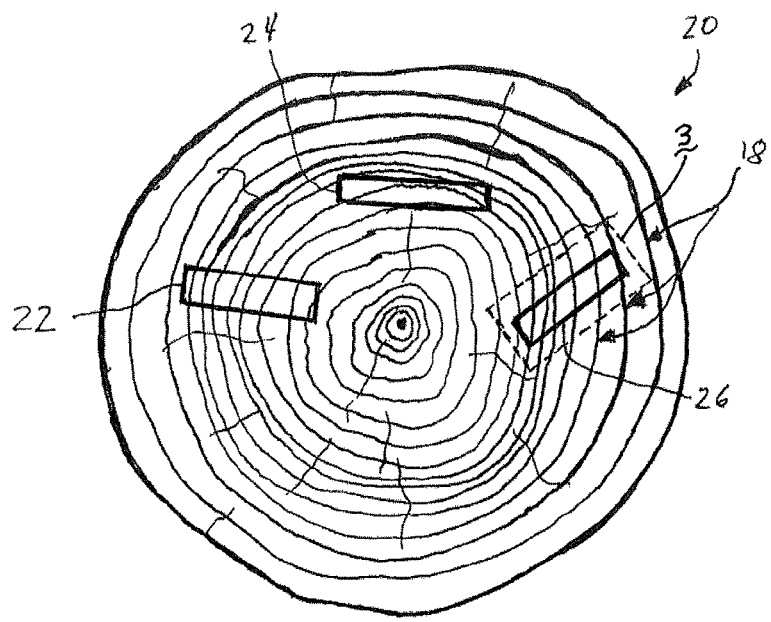
FIG. 2 illustrates a partial cross-sectional view of a wood section showing various cut configurations relative to local grain orientation.
Figure 3:
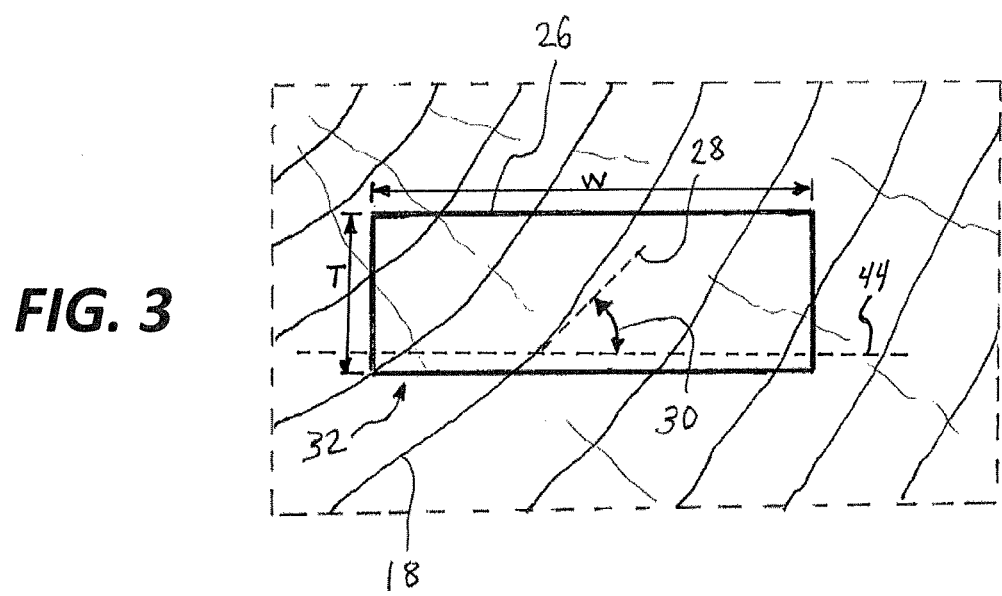
FIG. 3 illustrates a detail view of Section 3 from FIG. 2 showing a random cut section for forming a wood blank.
Figure 4:
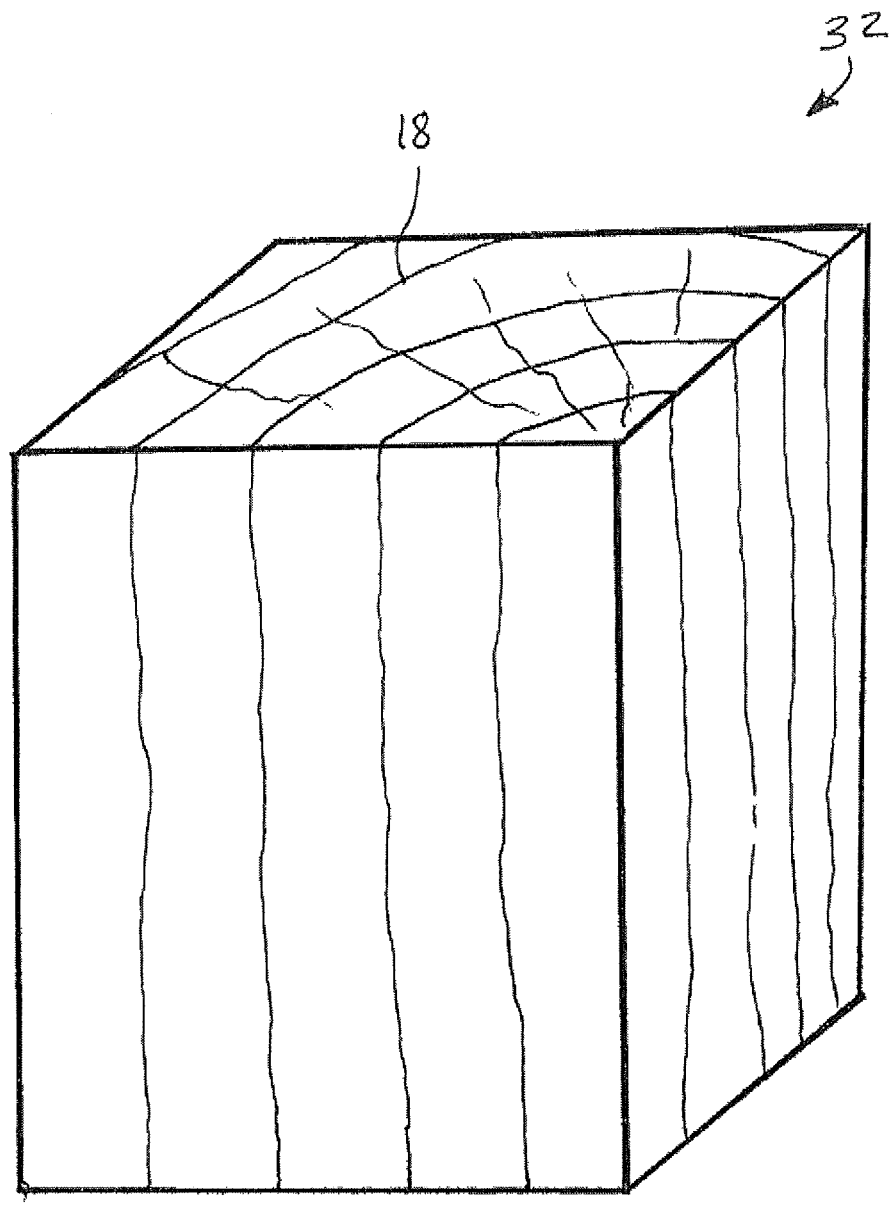
FIG. 4 illustrates a perspective view of an embodiment of a random-cut wood blank for forming a handle in accordance with the present invention.

Referring now to FIGS. 2-4, various samples of wood materials are generally illustrated. Another aspect of the present invention provides a cookware device 10, or cookware device handle 16, including balsa wood having a particular grain orientation. Balsa wood materials are generally obtained from balsa trees. FIG. 2 illustrates an example of a cross-sectional view of a balsa tree from which balsa wood material may be obtained. It is generally known that growth rings 18 form in a concentric circular pattern extending outwardly from a center of the cross-section. Growth rings 18 generally form a longitudinally-extending wood grain pattern. The grain pattern may differ at various radial locations relative to the center of the cross-section. A balsa log section cut from a balsa tree may be used to make balsa wood boards, or a balsa wood blank 32, as seen in FIG. 4. A balsa wood blank 32 may be cut from various cross-sectional locations. The location from which the balsa wood blank 32 is cut can determine the grain properties and local grain orientation, or grain angle, of the blank. For example, as seen in FIG. 2, a radial cut blank 22 is cut with a major cross-sectional axis aligned in a substantially radial direction relative to the center of the growth ring pattern. In contrast, a tangential cut blank 24 is cut with a major cross-sectional axis aligned in a substantially tangential direction relative to the local growth rings near the blank. Wood blanks having different types of cut orientations will exhibit different mechanical properties. A third type of cut, known as a random or angled cut may be used to form an angled blank 26. Angled blank 26 has a major cross-sectional axis 44 oriented at an angle relative to the local growth rings. More particularly, as seen in FIG. 3, in some embodiments, angled blank 26 includes a cross-section having a cross-sectional width W and a cross-sectional thickness T. The major cross-sectional axis 44 is defined in the direction of the larger of cross-sectional width W and cross-sectional thickness T. As seen in FIG. 3, the local wood grain growth rings 18 form a grain angle 30 defined as the angle between the major cross-sectional axis 44 and a reference tangent axis 28 oriented substantially tangential to the local growth rings. In some embodiments, the present invention provides a cookware device handle including balsa wood having an angled cut and defining a grain angle 30 of between about 30 degrees and about 60 degrees. Additionally, in additional embodiments, the present invention provides a cookware device handle including balsa wood having an angled cut and defining a grain angle 30 of between about 40 degrees and about 50 degrees. In some additional embodiments, the grain angle 30 is about 45 degrees. It has been discovered as part of the present invention that grain angle may influence the specific heat of balsa wood material. By selecting balsa wood blanks for cookware device handle 16 having desired grain angles in the ranges cited above, the specific heat of the balsa wood material may be further increased to provide the desired characteristics of the present invention.

Additionally, the material property of grain angle 30 may be combined with a desired material density in some embodiments to provide a balsa wood cookware device or balsa wood cookware device handle having the ability to be heated under normal cooking conditions, yet remain cool enough to be handled directly with a bare hand immediately after cooking. The synergistic effects of combining both an optimal density and an optimal grain angle allow enhanced material and thermal properties and higher specific heat values for balsa wood handles. The combination of these properties for cookware devices and cookware device handles is generally unknown in the art.

In some additional embodiments, the present invention further provides cookware devices and cookware device handles including balsa wood cut from trees aged at least five years old at the time of cutting. It has been discovered that in some aspects of the present invention balsa wood trees aged at least five years at the time of cutting provide wood blanks with increased specific heat properties. As such, balsa wood cookware devices or cookware device handles include advantageous properties. This aspect of the present invention may be combined with the other material properties of low density and grain angle to further produce balsa wood cookware products with desired thermal properties. In some applications, the present invention provides a cookware device including a handle having balsa wood obtained from a portion of a balsa wood tree that was living between about five years and about ten years.

Specific heat of balsa wood may be further increased by overwatering the balsa wood trees from which the balsa wood blanks are cut while the trees are living. By overwatering the balsa wood trees, the cellular microstructure may be expanded, further reducing the material density and providing enhanced thermal properties of resulting wood blanks.

Figure 5:
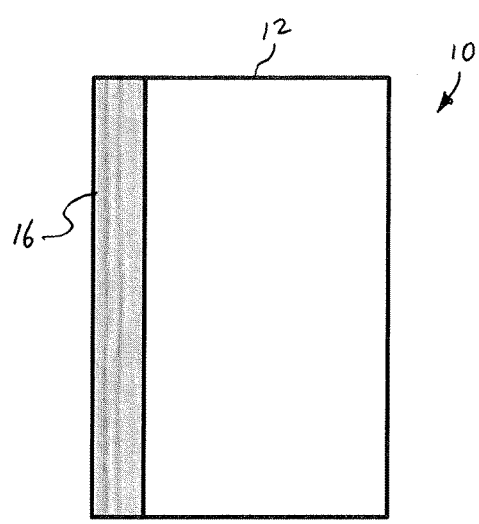
FIG. 5 illustrates a plan view of an embodiment of a cooking apparatus including a handle in accordance with the present invention.
Figure 6:
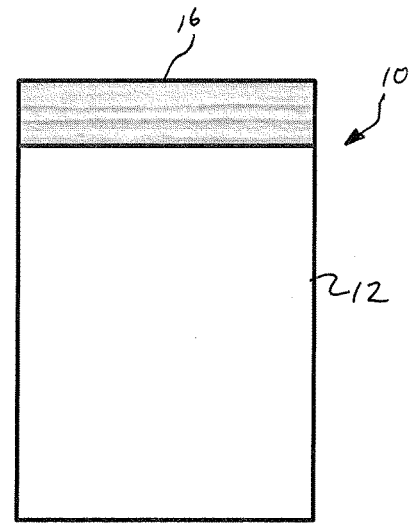
FIG. 6 illustrates a plan view of an embodiment of a cooking apparatus including a handle in accordance with the present invention.
Figure 7:
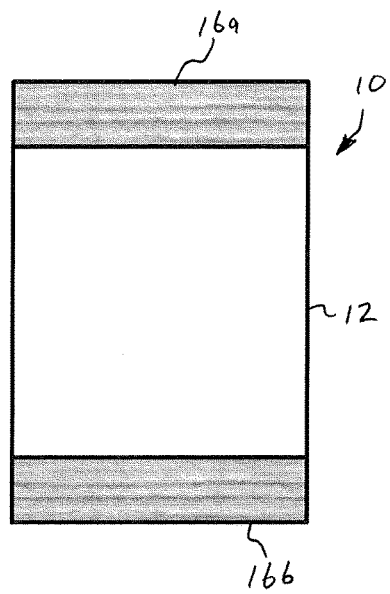
FIG. 7 illustrates a plan view of an embodiment of a cooking apparatus including handles in accordance with the present invention.
Figure 8:
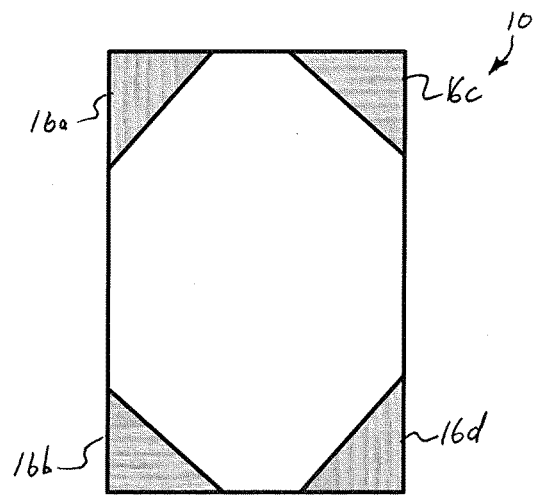
FIG. 8 illustrates a plan view of an embodiment of a cooking apparatus including handles in accordance with the present invention.
Figure 9:
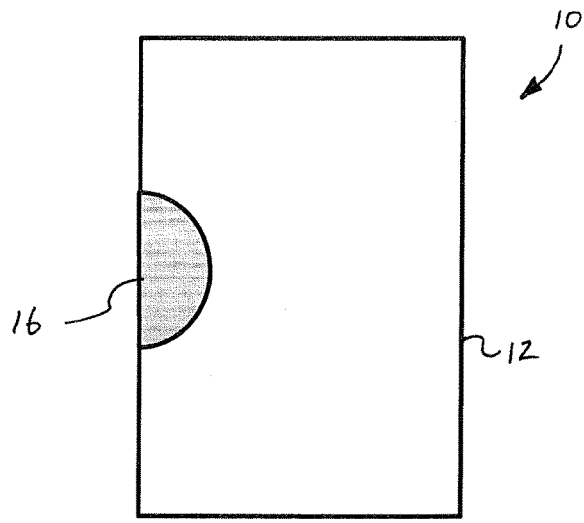
FIG. 9 illustrates a plan view of an embodiment of a cooking apparatus including a handle in accordance with the present invention.
Figure 10:
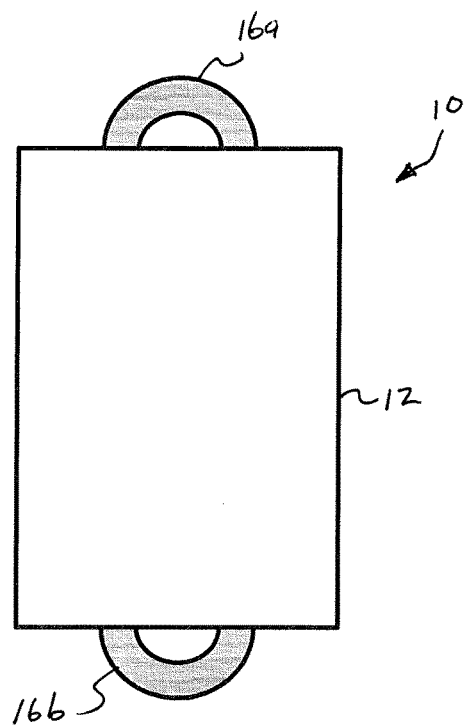
FIG. 10 illustrates a plan view of an embodiment of a cooking apparatus including handles in accordance with the present invention.

Various additional embodiments of the present invention are illustrated in FIGS. 5-12. In some embodiments, the present invention provides a cookware device in the form of a cooking sheet or cooking pan. As seen in FIG. 5, in some embodiments, cookware device 10 includes a cooking sheet having a base 12 and a handle 16 attached to the base 12. Handle 16 includes balsa wood. In some embodiments, handle 16 includes balsa wood having a density of less than about seven pounds per cubic foot. In additional embodiments, handle 16 includes balsa wood having a grain angle between about 30 degrees and about 60 degrees. In further embodiments, handle 16 includes balsa wood formed from a wood blank cut from a balsa tree that had been living for at least five years. In additional embodiments, handle 16 includes two or more of the above listed properties. As seen in FIG. 5, handle 16 can be oriented on a longitudinal edge of cookware device 10. In some other embodiments, handle 16 is positioned along a lateral edge of cookware device 10, shown for example in FIG. 6. As seen in FIG. 7, cookware device 10 includes a first handle 16a and a second handle 16b positioned at opposite lateral edges of cookware base 12. As seen in FIG. 8, in some embodiments, cookware device 10 includes four handles 16a, 16b, 16c, and 16d each positioned at a corner of base 12, wherein each handle includes balsa wood and includes the shape of a triangle. In additional embodiments, as seen in FIG. 9, handle 16 includes the shape of a semi-circular arc and is positioned at a location along a longitudinal edge of base 12. Further, in some embodiments, as seen in FIG. 10, a first handle 16a forms a first semi-circular arc protruding from a first lateral edge of base 12, and a second handle 16b forms a second semi-circular arc protruding from a second opposite lateral edge of base 12.

Figure 11:
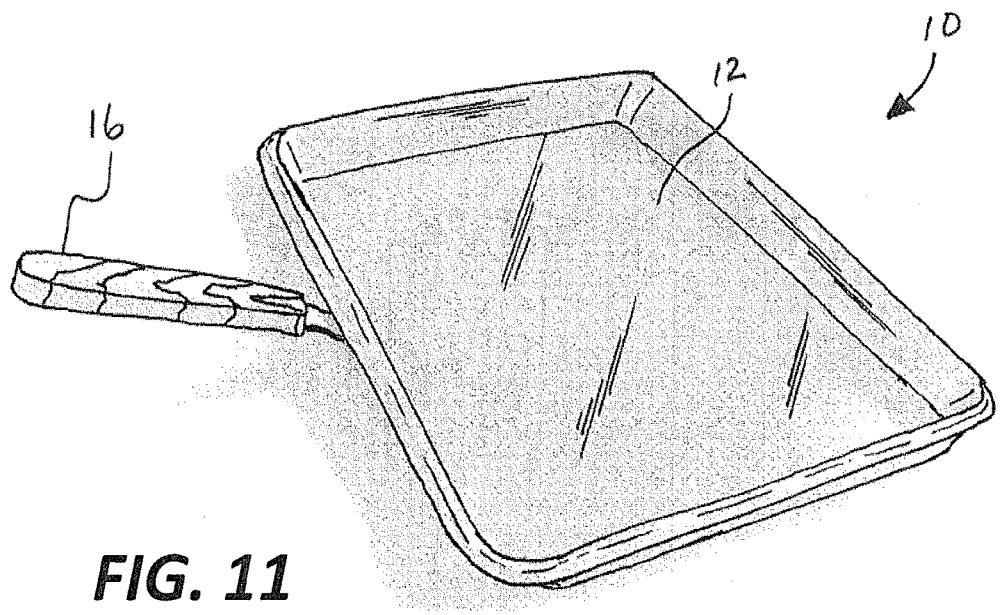
FIG. 11 illustrates perspective view of an embodiment of a cooking apparatus including a handle in accordance with the present invention.
Figure 12:
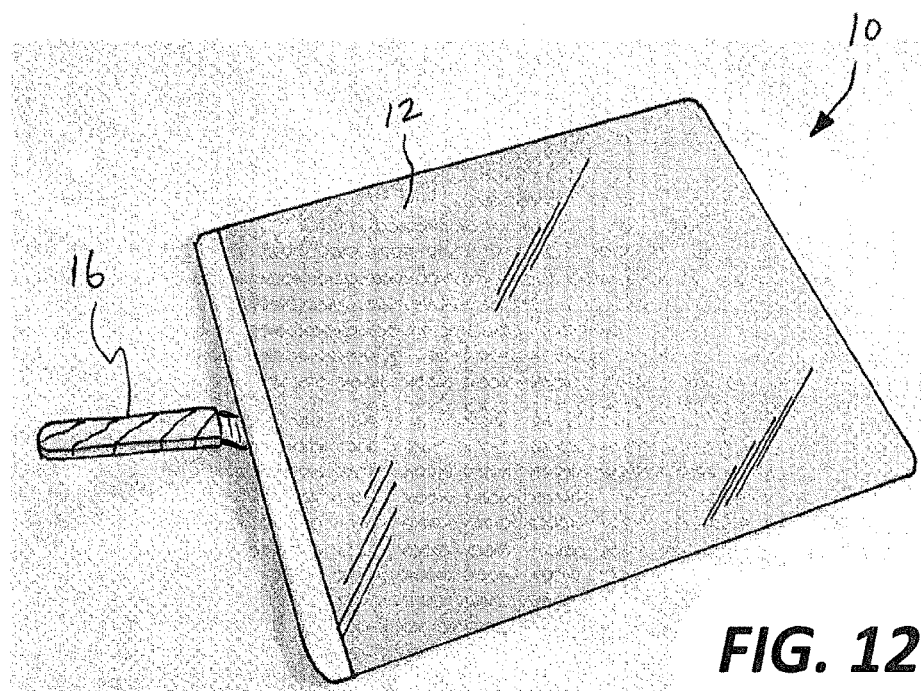
FIG. 12 illustrates a perspective view of an embodiment of a cooking apparatus including a handle in accordance with the present invention.
Figure 13:
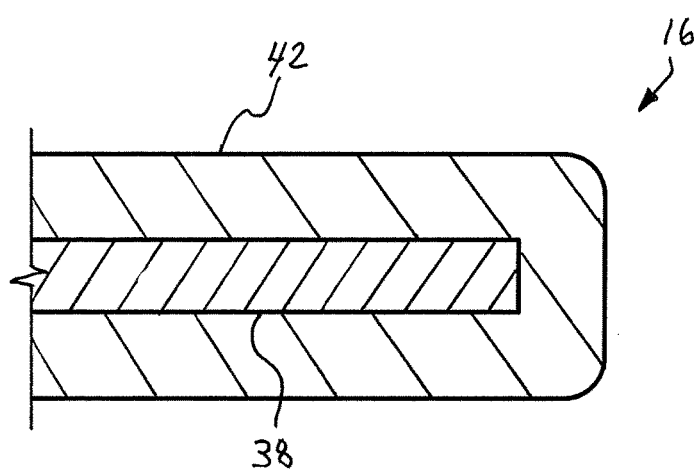
FIG. 13 illustrates a partial cross-sectional view of an embodiment of a handle in accordance with the present invention.

Referring to FIGS. 11 and 12, in some embodiments, cookware device 10 includes a base 12 and a handle 16 protruding from base 12. Handle 16 includes balsa wood with one or more of the previously identified material properties for providing desired thermal performance. Handle 16 may be rigidly fixed to base 12, or in alternative embodiments may be modularly detachable from base 12. In some embodiments, as seen in FIG. 13, handle 16 includes a wooden handle exterior 42 surrounding or otherwise disposed on a handle core 38. Handle core 38 may include any suitable rigid material such as stainless steel, aluminum, carbon fiber, etc. Handle core 38 is attached to base 12 on cookware apparatus 10, and handle exterior 42 forms a component attached to handle core 38. Handle core 38 and handle exterior 42 collectively form handle 16. Referring further to FIG. 1, in some embodiments, lid 14 includes a lid grip 36 made of balsa wood having the mechanical and thermal properties discussed above.

In additional embodiments, the cookware apparatus 10 and handle 16 of the present invention may be used for other applications involving placement of any vessel or structure near or in a heat source. The present invention is thus not limited to the field of cooking edible food, but may also be used in other thermally-intensive applications involving the heating of materials. These applications could include but are not limited to processing, molding, casting, forging, heat-treating, baking, drying, curing, etc. In any of these applications, it may be desirable to provide a cookware apparatus or utensil with a handle that can be subjected to heat but may still be grasped with a bare hand following heating such that an insulating material is not needed for gripping the handle. As such, the term cookware may be defined as any structure for containing or manipulating materials to be heated.

Thus, although there have been described particular embodiments of the present invention of a new and useful Balsa Wood Cookware Apparatus it is not intended that such references be construed as limitations upon the scope of this invention except as set forth in the following claims.

What is claimed is:

1. A cookware apparatus, to be placed in an oven, comprising:
   a base; and
   a handle attached to the base, wherein the handle comprises balsa wood; and
   wherein the balsa wood includes a density of between about four pounds per cubic foot and about seven pounds per cubic foot; and
   wherein the balsa wood has a grain angle between about 30 degrees and about 60 degrees; and
   wherein the balsa wood has a specific heat of greater than about 3.5 joules per gram-Kelvin; and
   wherein the balsa wood is formed from a wood blank, wherein the wood blank was obtained from a portion of a balsa tree that was living for at least five years.

2. A cookware apparatus, comprising:
   a cookware base configured to store one or more food items to be cooked; and
   a grip region disposed on the base, the grip region comprising balsa wood;
   wherein the balsa wood includes a density of between about four pounds per cubic foot and about seven pounds per cubic foot; and
   wherein the balsa wood has a grain angle between about 30 degrees and about 60 degrees; and
   wherein the balsa wood has a specific heat of greater than about 3.5 joules per gram-Kelvin; and
   wherein the balsa wood is formed from a wood blank, wherein the wood blank was obtained from a portion of a balsa tree that was living for at least five years.

* * * * *